United States Patent [19]

Zander et al.

[11] Patent Number: 5,700,303

[45] Date of Patent: Dec. 23, 1997

[54] CHROME POLISH/EXHAUST PIPE DE-BLUER

[76] Inventors: Richard A. Zander; Jeffrey S. McKenzie, both of 10507 Gravelly Lk Dr. SW. Ste. 15A-235, Tacoma, Wash. 98499

[21] Appl. No.: 742,204

[22] Filed: Oct. 31, 1996

[51] Int. Cl.⁶ .................................................. C09G 1/02
[52] U.S. Cl. ...................................... 51/309; 106/3
[58] Field of Search ............................ 106/3; 51/307, 51/309

[56] References Cited

U.S. PATENT DOCUMENTS

| | | |
|---|---|---|
| 4,952,240 | 8/1990 Smith | 106/3 |
| 5,104,421 | 4/1992 Takizawa et al. | 106/3 |
| 5,123,958 | 6/1992 Wiznd | 106/3 |
| 5,226,955 | 7/1993 Owaki | 106/3 |
| 5,366,542 | 11/1994 Yamada et al. | 106/3 |

*Primary Examiner*—Deborah Jones

[57] ABSTRACT

This invention is directed to a chrome polish/exhaust pipe de-bluer consisting of 20 lbs aluminum powder and 8 oz walnut shell powder.

1 Claim, No Drawings

CHROME POLISH/EXHAUST PIPE DE-BLUER

The present invention is directed to a chrome polish that polishes and removes exhaust pipe discoloration on chrome exhaust systems.

TECHNICAL FIELD

The field of endeavor is the polishing and removal of discoloration of chrome.

SUMMARY OF INVENTION

The chrome polish is not only a polish but also removes any discoloration on chrome exhaust systems. Products that claim to do this now are petroleum based abrasive compounds that scratch and dull the surface of the metal as well as leave an oily residue that burns on the exhaust immediately after cleaning. The present chrome polish has no petro chemicals of any kind and does not scratch while removing exhaust pipe discoloration.

DETAILED DESCRIPTION

The chrome polish consists of a mixture of 20 lbs. of (I) Aluminum oxide, alumina powder and (II) 8 oz. walnut shell powder. Once mixed a cloth is dampened and dabbed into the mixture and applied to the metal surface making a paste. By rubbing the area all discoloration is removed. The chrome polish may be wiped with dry cloth to finish.

We claim:

1. A chrome polish/exhaust pipe de-bluer consisting of a mixture of 20 lbs. aluminum oxide powder and 8 oz. walnut shell powder.

* * * * *